United States Patent [19]

Leidel

[11] Patent Number: 4,865,778
[45] Date of Patent: Sep. 12, 1989

[54] COMPOSITE DIFFUSER ASSEMBLY

[75] Inventor: David A. Leidel, Whitinsville, Mass.

[73] Assignee: Aeration Engineering Resources, Worcester, Mass.

[21] Appl. No.: 277,984

[22] Filed: Nov. 30, 1988

[51] Int. Cl.⁴ ............................................... B01F 3/04
[52] U.S. Cl. ................................. 261/122; 156/73.1; 156/308.4; 156/309.9
[58] Field of Search ............ 261/122; 156/73.1, 308.4, 156/309.9

[56] References Cited

U.S. PATENT DOCUMENTS

| | | | |
|---|---|---|---|
| 2,040,941 | 5/1936 | Jones et al. | 261/122 |
| 2,354,609 | 7/1944 | Phipps | 261/122 |
| 2,575,193 | 11/1951 | Shire | 261/122 |
| 2,898,282 | 8/1959 | Flook, Jr. et al. | 261/122 |
| 3,100,172 | 8/1963 | Nier | 156/309.9 |
| 3,202,285 | 8/1965 | Williams | 261/122 |
| 3,264,160 | 8/1966 | Donofrio | 156/309.9 |
| 3,396,950 | 8/1968 | Wood | 261/122 |
| 3,768,788 | 10/1973 | Candel | 261/122 |
| 3,953,554 | 4/1976 | Loughridge | 261/122 |
| 3,970,731 | 7/1976 | Oksman | 261/122 |
| 4,382,867 | 5/1983 | Schmit et al. | 261/122 |
| 4,410,575 | 10/1983 | Obayashi et al. | 156/308.4 |
| 4,478,660 | 10/1984 | Landler et al. | 156/309.9 |
| 4,514,242 | 4/1985 | MacLaughlin et al. | 156/309.9 |
| 4,558,957 | 12/1985 | Mock et al. | 156/308.4 |
| 4,629,591 | 12/1986 | Forsyth | 261/122 |
| 4,668,556 | 5/1987 | Hermann et al. | 156/308.4 |

FOREIGN PATENT DOCUMENTS 3600232  7/1987  Fed. Rep. of Germany ...... 261/122

Primary Examiner—Tim Miles
Attorney, Agent, or Firm—Shlesinger & Myers

[57] ABSTRACT

A porous, rigid diffuser assembly formed by securing a porous diffuser element to a plastic baseplate along a limited-zone perimeter by temporarily rendering the baseplate semi-plastic, pressing these elements together so that the plastic is pressed into the exposed pores of the diffuser element, then hardening the baseplate to form a combined mechanical and airtight bond.

9 Claims, 1 Drawing Sheet

COMPOSITE DIFFUSER ASSEMBLY

FIELD OF THE INVENTION

This invention relates to a diffuser means for use in the distribution of the treating air in a sewage aeration treatment system and the like.

BACKGROUND DISCUSSION

The aeration process for the treatment of domestic and industrial wastewaters is a well known procedure. More particularly in grid-type aeration systems wherein a number of porous air diffusing means are submerged within the fluid mass of sewage, there is a need to provide very efficient but inexpensive diffuser means for producing the desired distribution of air bubbles throughout the mass to effect the necessary aeration action. This invention provides an improved structure for this purpose that makes use of conventional rigid porous diffuser plates including dome shaped elements carried on an integral baseplate, a plurality of which baseplate and diffuser assemblies are adapted to be mounted on the air distribution pipes that extend across the bottom of the tank, which contains the fluid mass of sewage to be treated.

Examples of certain known types of diffuser means are shown in the following prior U.S. Pat. Nos.:

3,396,950 to Wood Aug. 13, 1986
3,953,554 to Longridge Apr. 27, 1976, and
4,382,867 to Schmit May 10, 1983.

The Schmit patent discloses a typical aeration tank layout and known means including a threaded ring and 0-ring assembly for mounting a porous diffuser plate on a plate holder, which holder is mounted integral with the air distribution pipe system. It has been found, however, that conventional gasket materials used in such assemblies may age rather rapidly in the chemically active liquid sewage bath, causing the sealing gaskets to crack, permitting localized streams of large relatively less efficient air bubbles to escape from the air distribution system that reduce the overall efficiency of the aeration process.

Wood and Longridge show samples of diffuser assemblies wherein porous members are cemented to a plate holder. Their disclosures go mostly to the structures of the elements to be assembled. Wood mentions a ceramic diffuser means but does not describe a specific adhesive for attaching this porous disk to the holder. Longridge, on the other hand, shows a design for making a two part, all plastic diffuser. He describes a porous cover or top element that has a non-porous flange that interfits with a non-porous bottom portion or plate holder and these two plastic parts may be assembled together by making use of any suitable means such as with an adhesive, welding, bayonet locking means, other fasteners and the like.

Other prior art attachment designs are well known which make use of bolt holes through the diffuser plate together with peripheral gasket means and conventional seals around the bolt means, which as with Schmit are subject to the same aging and subsequent leakage of air in large bubble streams that flow upwardly in the fluid bath. These prior art structures including the Schmit, Wood and Longridge patents are all examples of attempts that have been made to improve on the efficiency of diffuser elements for use in the aeration treatment process and the present invention provides an improved design for a more useful diffuser assembly which operates more efficiently over a longer life span than any of the known diffusers.

BRIEF DESCRIPTION OF THIS INVENTION

The present invention provides an improved assembly by permanently mounting a rigid porous diffuser plate on a baseplate holder made of polyvinylchloride (PVC) or an equivalent resin selected from a class of inert plastic materials that are well adapted for use in the corrosive fluid baths that are usually found in the tanks of sewage treatment plants and in the systems used in certain industrial waste aeration treatment facilities. The purpose of this teaching is to provide a construction wherein the properties of the rigid porous diffuser are combined with the properties of the plastic holder to produce a stronger and a completely sealed bond between the porous plate and its holder and that provides an inexpensive unitary diffuser structure that can be quickly and easily assembled together with the air distribution piping system.

Basically this improvement takes advantage of the property of the PVC holder for the porous diffuser which allows it to be rendered temporarily at least semi-plastic in a zone that is adapted to be integrated with a peripheral zone of the diffuser. When a selected portion of the PVC is softened to a flowable state, this zone of the holder, that is to be integrated with the porous diffuser plate, is pressed, under pressure, against its zone of contact with the porous diffuser means to force the mobile plastic into the pores of the diffuser throughout that zone and then when the plastic is allowed to harden again, a hydraulic seal and mechanical bond is formed between the baseplate holder and the porous plate. Such an integration of the porous diffuser with the baseplate holder to form a securely bonded, permanently leak proof, unitary assembly, provides a diffuser means with a PVC holder that may be designed to be quickly attached to a suitable saddle means carried integrally on the air distribution pipe system. The baseplate holder may, for example, be provided with a threaded interfit or other connection means for cooperating respectively with the conventional saddle structures supported on the pipes of the air distribution system. A plurality of such diffuser assemblies may be easily fitted to the plurality of cooperating saddles spaced apart throughout the air distribution manifold system to provide a complete aeration grid.

IN THE DRAWINGS

DETAILED DESCRIPTION

As is well known, a typical sewage or wastewater treatment plant usually has a number of tanks, each of which is designed to hold an aqueous dispersion of wastewater to be treated. A plurality of air distributing pipes are supported from a header to extend across the bottom of each tank and each distribution pipe has a series of air diffuser means associated with it to cause millions of minute air bubbles to be released into the fluid mass of sewage. The air bubbles float to the top of the fluid mass in the tank as they move upwardly, and the sewage is continuously treated for a length of time to thoroughly aerate the entire mass in order to promote the necessary chemical reactions that substantially destroy all of the harmful components in the sewage bath.

Figure 1:
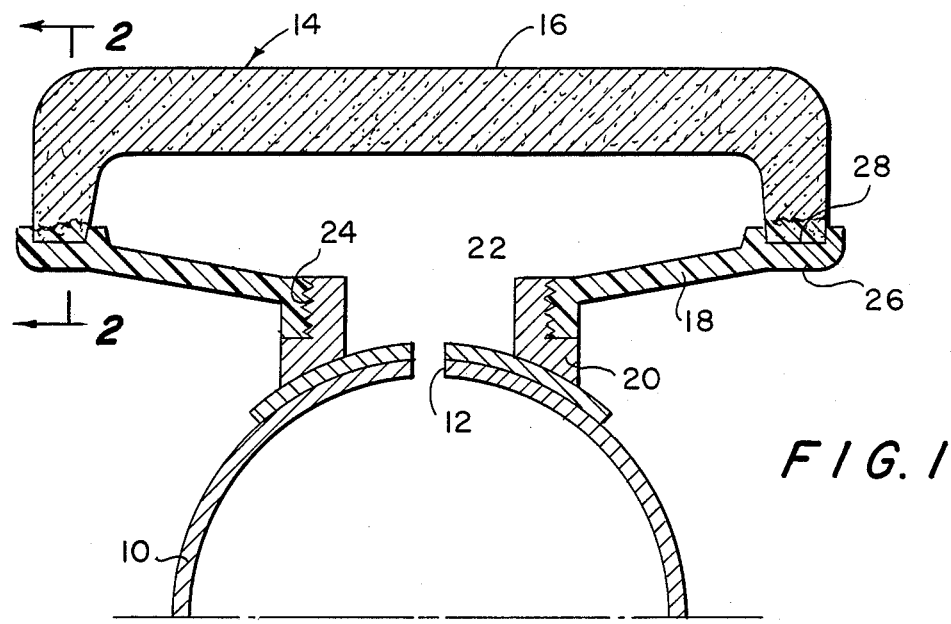
FIG. 1 is a vertical section through an assembly showing the composite diffuser structure of this invention mounted on an air distribution pipe.

A sectional view through one such air distribution pipe 10 and aeration dome is shown in FIG. 1. The air supply pipe 10 has a series of holes 12 disposed along its upper surface, one of which holes is shown in FIG. 1 for permitting the air supplied under a suitable pressure to issue into each of the diffuser means 14 supported over the pipe. The diffuser means shown in FIG. 1 preferably takes the form of a porous ceramic dome 16 of well known sintered construction that is carried on a polyvinyl- chloride baseplate 18, which in turn is supported on a PVC saddle 20 permanently affixed to the top of the air distribution pipe in a position centered around the air hole 12. As is well known, the internal phase of such sintered porous domes are filled with a multiplicity of open and interconnected pores which cause the air flow to be divided into the desired multiplicity of minute bubbles that escape from the top of the diffuser element to float upwardly through the fluid bath of sewage being treated.

The saddle 20 has an integral vertically extending neck portion 22 that may be internally threaded to receive a cooperating threaded aperture 24 centrally disposed on the underside of the baseplate 18. The outer perimeter portion 26 of the baseplate is preferably made to be concentric with the aperture 24 when a circular diffuser 16 is used, but it is possible that diffusers of a non-circular shape could be used, but in either event, said perimeter of each baseplate 18 is designed to have a limited zone 28 that is made to have an intimate bonded contact with the perimeter of the diffuser 16.

Figure 2:
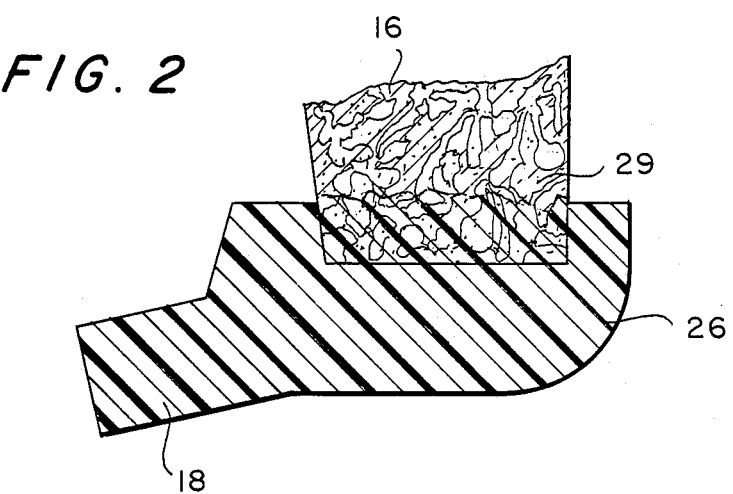
FIG. 2 is an enlarged view partly broken away taken on the plane 2—2 of FIG. 1, illustrating the bonded joint between the porous diffuser plate and the baseplate holder.

This bonded connection between the PVC baseplate and the diffuser at the zone 28, as best seen in FIG. 2, is accomplished by first rendering the perimeter 26 of the PVC member temporarily at least semi-plastic by contacting it with a heated ceramic diffuser and then applying sufficient pressure between the plastic material and the diffuser to cause the PVC to engage in an intimate contact with this area of the diffuser and to enter into the exposed and interconnected pores 29 of the diffuser throughout this peripheral zone 28. After the intimate infiltration of the pores of the diffuser throughout this zone has been completed, the perimeter area of PVC is cooled and the PVC hardens in the pores into which it has been forced to flow and the remaining PVC in contact with the solid portions of the diffuser that are exposed throughout zone 28, become intimately bonded thereto to produce an airtight seal and mechanical bond between the diffuser 16 and the baseplate 18.

A baseplate manufactured by Georgia Gulf of Plaquemine, LA and sold as their 5009 PVC can be rendered sufficiently mobile or fluid to produce this intimate bonding of the zone 28 with the peripheral porous surface to the baseplate by heating the diffuser to a temperature in the range of about 125° C. to 140° C. When the heated diffuser and PVC are placed in contact, the PVC is heated up and the thermoplastic PVC becomes sufficiently mobile to render it flowable and when a pressure of about 0.5 lb. per square inch is applied against the heated PVC throughout zone 28 the desired pore infiltration results such as illustrated in FIG. 2. When the PVC is then cooled, this infiltration creates an airtight seal and mechanical bond between the diffuser and the plastic throughout all of the area of zone 28.

Alternatively the PVC may also be rendered at least temporarily mobile by other well known means such as by subjecting the peripheral area of the baseplate to ultrasonic vibrations or by incorporating ferrous material in the PVC and magnetically agitating the ferrous material. The baseplate may be made of other thermoplastic materials such as polypropylene, and the like, having thermoplastic properties similar to PVC. While such alternate materials can be used equally as well as PVC, the latter is preferred because of its current extensive use in the sewage treatment field where it has been proven to be quite inert and not subject to deterioration over time.

While a ceramic dome shaped porous diffuser element has been used for illustration of the invention in FIG. 1, it is apparent that disks or other shapes of porous diffuser elements 16, either made of ceramic or other materials as is well known in the art, can be similarly bonded to a PVC or other plastic baseplate. It is to be noted, however, that in order to produce the mechanical bond and airtight seal between the diffuser and its baseplate as here taught, the peripheral area of the diffuser at zone 28, must have an open and interconnected pore system throughout its internal phase and must be exposed throughout the entire zone 28 to the peripheral area of the baseplate in order to produce the desired infiltration of the mobile plastic into these pores. The baseplate and the porous diffuser plate are joined together as described above by integrating the surface of the peripheral area 26 of the baseplate with the internal pores and the exterior surface of the diffuser with which it is in contact to complete a bonding throughout the zone 28 to form a completely airtight and physically secure attachment of the porous diffuser 16 to the baseplate 18.

As suggested above, it is apparent that other types of porous diffuser elements may similarly be mounted permanently on a baseplate by infiltering the temporarily mobile plastic material of the baseplate into the pores of any kind of porous diffuser element and then hardening the plastic to complete the bonding of the baseplate to the porous diffuser element. Such other porous diffusers have been made of plastic beads, organic particles with or without a binder, glass beads, metal particles, and other such materials that are inert to the chemicals in the fluid sewage bath.

Figure 3:
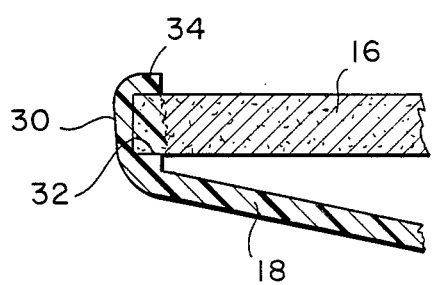
FIG. 3 is a sectional view, partly broken away of an alternate bonded joint formed between the porous diffuser element and the element holder.

The periphery of the baseplate 18 may also be configured as shown in FIG. 3 to form an even stronger bonding of the baseplate to the porous diffuser element. In this form of the invention, the baseplate 18 has a peripheral wall 30 integral therewith. The inside of the wall 30 is configured to completely surround the periphery of the porous diffuser element 16. When the diffuser element 16 is first seated on a shoulder 32 on the inside of wall 30, the periphery of the baseplate can be heated by any one of the methods suggested above to soften the wall 30 and shoulder 32 and when this peripheral portion of the baseplate is rendered temporarily mobile, the top portion of wall 30 can be made to flow over the periphery of the porous disk to form a shoulder 34. When subsequently a sufficient pressure is applied to the flowable plastic, it is made to infiltrate into the pores of the diffuser 16 to have an intimate contact with the pores exposed at the periphery of the diffuser element such as plate 16. With this construction, the diffuser is mechanically trapped within the wall 30 and between shoulders 32 and 34. The diffuser is also bonded intimately to the baseplate by means of the inner surface of wall 30 and the shoulders being infiltrated into the pores of the diffuser and the physical bonding of the plastic to surface of the diffuser as the plastic cools and hardens.

When designing the baseplate and its mounting on saddle 20, the aperture 24 can be made sufficiently large as to permit, upon the removal of this diffuser assembly from saddle 20, an easy cleaning of the interior plenum chamber formed between the bottom of the porous diffuser and the upper surface of the baseplate. It sometimes happens, due to a backflow of fluid from the tank into the plenum chamber or otherwise, that debris deposits on the underside of the diffuser and covers some of its pores and interferes with the distribution of the minute air bubbles from the diffuser element. To improve the aeration treatment it is then essential that any such collection of internal debris in the chamber be removed and thus this above described diffuser element and baseplate assembly lends itself well to the necessary cleaning process which must be performed in a treatment plant from time to time.

While the above is a description of the preferred form of this invention, it is possible that modifications thereof may occur to those skilled in the art, that may fall within the scope of the following claims.

What is claimed:

1. A diffuser assembly including a porous rigid aeration diffuser element and a baseplate adapted to operatively support and connect said diffuser with an air distributing means comprising a plastic baseplate means, said plastic being adapted to be rendered at least temporarily semi-plastic, said diffuser element having a perimeter that is defined by a limited zone, said baseplate means having a portion thereof shaped to be in contact with said limited zone that is adjacent to and substantially surrounds said perimeter of the diffuser element, said portion of said baseplate means having been temporarily rendered at least semi-plastic and then pressed into the exposed pores of said diffuser element throughout said zone and into contact with the surface area of said zone while it is in said semi-plastic state and then hardened again to produce an intimate permanently bonded relationship with said diffuser element throughout said limited zone, and said baseplate means having connecting means for coupling said assembled diffuser element and baseplate means as a unit to means for effecting the delivery of air from the air distributing means to said diffuser assembly.

2. An assembly as in claim 1 wherein said bonded relationship is an airtight bond.

3. An assembly as in claim 1 wherein said bonded relationship includes a mechanical bond when said plastic hardens in said pores.

4. An assembly as in claim 1 wherein said bonded relationship is a combined airtight and mechanical bond.

5. An assembly as in claim 1 wherein said baseplate is a polyvinylchloride means.

6. An assembly as in claim 5 wherein said diffuser is a porous ceramic element.

7. An assembly as in claim 6 wherein said bonded relationship includes a mechanical bond throughout said zone between said polyvinylchloride baseplate and said porous ceramic element which mechanical bond is produced when said portion of said base means that is temporarily rendered at least semiplastic is pressed into the pores of said porous ceramic element and is then hardened throughout said limited zone.

8. An assembly as in claim 6 wherein said bonded relationship includes an airtight bond between said polyvinylchloride baseplate and said porous ceramic element throughout said limited zone that is produced when said portion of said base means is temporarily rendered at least semi-plastic and is pressed into its intimate bonded relationship with said porous ceramic element.

9. An assembly as in claim 8 wherein a combined airtight and mechanical bond is produced.

* * * * *